(12) United States Patent
Byun et al.

(10) Patent No.: US 12,735,123 B2
(45) Date of Patent: Sep. 15, 2026

(54) ACTIVE AIR SKIRT DEVICE

(71) Applicant: HYUNDAI MOBIS CO., LTD., Seoul (KR)

(72) Inventors: Jae Sup Byun, Yongin-si (KR); Jang Ho Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 211 days.

(21) Appl. No.: 18/813,819

(22) Filed: Aug. 23, 2024

(65) Prior Publication Data

US 2025/0269912 A1 Aug. 28, 2025

(30) Foreign Application Priority Data

Feb. 27, 2024 (KR) ........................ 10-2024-0027780

(51) Int. Cl.
*B62D 35/00* (2006.01)

(52) U.S. Cl.
CPC .................................. *B62D 35/005* (2013.01)

(58) Field of Classification Search
CPC ........ B60Q 1/18; B60Q 1/20; B60Q 2400/30; B60Q 1/2692; B60Q 1/2661
USPC ............................... 296/180.1; 362/505, 496
See application file for complete search history.

(56) References Cited

U.S. PATENT DOCUMENTS 6,264,354 B1 * 7/2001 Motilal ................ B60Q 1/0483 362/523
6,923,564 B2 * 8/2005 Steward ................... B60Q 1/05 296/180.1
7,686,382 B2 * 3/2010 Rober .................. B62D 35/005 296/180.1
11,325,521 B2 * 5/2022 Klop ....................... B60R 19/50
2008/0122236 A1 * 5/2008 Peterson .............. B60Q 1/2611 296/3

FOREIGN PATENT DOCUMENTS

GB 2222556 A * 3/1990 ............. B60R 13/04

* cited by examiner

*Primary Examiner* — Joseph D. Pape
(74) *Attorney, Agent, or Firm* — NSIP Law

(57) ABSTRACT

An active air skirt device, and an active air skirt device for a vehicle are provided. The active air skirt device includes a housing; an actuator installed in the housing; a skirt installed in an internal space of the housing and configured to reciprocate vertically; a lamp arranged between the housing and the skirt in the internal space to reciprocate vertically; and a drive link connected to the skirt and the lamp. The drive link transmits power from the actuator, and selectively moves the skirt or both the skirt and the lamp depending on the rotation direction of the drive link.

20 Claims, 13 Drawing Sheets

ACTIVE AIR SKIRT DEVICE

CROSS-REFERENCE TO RELATED APPLICATION(S)

The present application claims the benefit under 35 USC § 119 of Korean Patent Application No. 10-2024-0027780, filed on Feb. 27, 2024, in the Korean Intellectual Property Office, the entire disclosure of which is hereby incorporated by reference for all purposes.

BACKGROUND

1. Field

The present invention relates to an active air skirt device for vehicles.

2. Description of the Related Art

Vehicles experience air resistance due to the collision of their bodies with the air during driving, which can be broadly categorized into drag and lift.

Drag is the opposing force acting on the vehicle due to direct air collision during motion, while lift is the phenomenon where the vehicle appears to rise due to the pressure difference between the upper and lower surfaces of the vehicle during movement.

These drag and lift forces reduce fuel efficiency and compromise driving safety, so it is necessary to improve them.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention aims to provide an active air skirt device for a vehicle that is capable of improving aerodynamic performance for enhancing fuel efficiency and driving stability, while also selectively implementing lamp functions.

The objects of the present invention are not limited to the aforesaid, and other objects not described herein will be clearly understood by those skilled in the art from the descriptions below.

In a general aspect of the disclosure, an active air skirt device includes: a housing; an actuator installed in the housing; a skirt installed in an internal space of the housing and configured to reciprocate vertically; a lamp arranged between the housing and the skirt in the internal space to reciprocate vertically; and a drive link connected to the skirt and the lamp, wherein the drive link is configured to: transmit power from the actuator; and selectively move the skirt or both the skirt and the lamp depending on the rotation direction of the drive link.

The drive link may include: a first skirt link comprising, at a first end, a drive shaft connected to the actuator, the drive shaft extendible through a hole formed on the housing; a second skirt link connected at a first end to a second end of the first link and, and at a second end, to the skirt; a first lamp link comprising a connecting shaft having a through hole at a first end through which the drive shaft passes; and a second lamp link connected at a first end to a second end of the first lamp link and, at a second end, to the lamp.

The first lamp link may include an engagement slot that is open towards one direction relative to a vertical centerline dividing the housing and passing through the hole, wherein the first skirt link may include an engagement protrusion engaging with the engagement slot, and wherein the first lamp link, based on the first skirt link rotating to the other direction opposite to the direction to which the engagement slot is open, is configured to rotate in the other direction together with the first skirt link.

The first lamp link may include a rotatably connected guide pin, which moves along a link guide groove formed on an inner surface of the housing, limiting a movement path and a range of the first lamp link.

The link guide groove may include: a circular arc shape centered around the hole; and a guide hole through which a rotation axis of the guide pin extends therethrough.

The second lamp link may include a structure including a curved portion forming a receiving recess open in one direction, and the receiving recess may accommodate the connecting shaft of the first lamp link and the drive shaft of the first skirt link, in response to the second lamp link being arranged towards the upper part of the housing along with the first lamp link.

The skirt may include: a connecting portion connected to the drive link; a first body portion extending downward from the connecting portion; and a second body portion bent at the bottom of the first body portion and extending towards the front of the housing, wherein the first body portion and the second body portion may extend outward from the bottom of the housing to face forward in front of the housing, in response to the connecting portion moving to the lower part of the housing.

The lamp may include: a lamp frame connected to the drive link; and a lamp module mounted on the lamp frame, the lamp module extending outward from the bottom of the housing and positioned to face forward in front of the housing in response to the lamp frame moving to the lower part of the housing.

The active air skirt may further include: a lamp bracket attached on the inner side of the housing to guide the movement of the lamp; and a skirt bracket attached to the side of the lamp bracket, opposite to the side facing the housing, to guide the movement of the skirt.

The lamp may be arranged between the inner side of the housing and the lamp bracket, and the skirt may be arranged between the lamp bracket and the skirt bracket.

In another general aspect of the disclosure, an active air skirt device for a vehicle may include: a housing; an actuator installed in the housing; a skirt installed in an internal space of the housing and configured to reciprocate vertically; a lamp arranged between the housing and the skirt in the internal space to reciprocate vertically; a drive link connected to the actuator, the skirt and the lamp; and a controller configured to actuate the actuator such that power from the actuator is transmitted to the drive link to selectively move, based on a rotation direction of the drive link, at least one of the skirt, the lamp, or a combination thereof.

The drive link may include: a first skirt link comprising, at a first end, a drive shaft connected to the actuator, the drive shaft extendible through a hole formed on the housing; a second skirt link connected at a first end to a second end of the first link and, and at a second end, to the skirt; a first lamp link comprising a connecting shaft having a through hole at a first end through which the drive shaft passes; and a second lamp link connected at a first end to a second end of the first lamp link and, at a second end, to the lamp.

The first lamp link may include an engagement slot that is open towards one direction relative to a vertical centerline dividing the housing and passing through the hole, wherein the first skirt link may include an engagement protrusion engaging with the engagement slot, and wherein the first lamp link, based on the first skirt link rotating to the other direction opposite to the direction to which the engagement slot is open, is configured to rotate in the other direction together with the first skirt link.

The first lamp link may include a rotatably connected guide pin, which moves along a link guide groove formed on an inner surface of the housing, limiting a movement path and a range of the first lamp link.

The link guide groove may include: a circular arc shape centered around the hole; and a guide hole through which a rotation axis of the guide pin extends therethrough.

The second lamp link may include a structure including a curved portion forming a receiving recess open in one direction, and the receiving recess may accommodate the connecting shaft of the first lamp link and the drive shaft of the first skirt link, in response to the second lamp link being arranged towards the upper part of the housing along with the first lamp link.

The skirt may include: a connecting portion connected to the drive link; a first body portion extending downward from the connecting portion; and a second body portion bent at the bottom of the first body portion and extending towards the front of the housing, wherein the first body portion and the second body portion may extend outward from the bottom of the housing to face forward in front of the housing, in response to the connecting portion moving to the lower part of the housing.

The lamp may include: a lamp frame connected to the drive link; and a lamp module mounted on the lamp frame, the lamp module extending outward from the bottom of the housing and positioned to face forward in front of the housing in response to the lamp frame moving to the lower part of the housing.

The active air skirt may further include: a lamp bracket attached on the inner side of the housing to guide the movement of the lamp; and a skirt bracket attached to the side of the lamp bracket, opposite to the side facing the housing, to guide the movement of the skirt.

The lamp may be arranged between the inner side of the housing and the lamp bracket, and the skirt may be arranged between the lamp bracket and the skirt bracket.

BRIEF DESCRIPTION OF THE DRAWINGS

FIGS. 5A and 5B are diagrams illustrating the structure and operation of the skirt in the active air skirt device;

DETAILED DESCRIPTION

Figure 1:
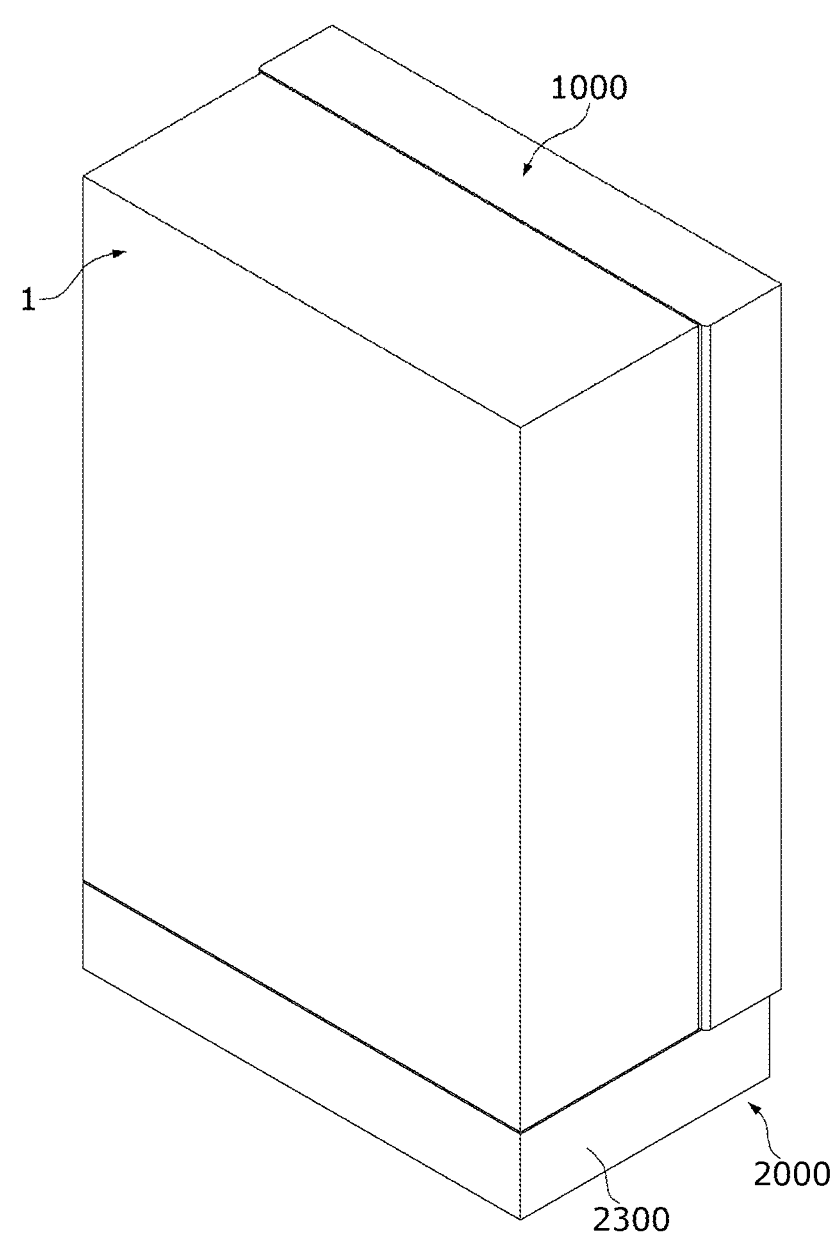
FIG. 1 is a diagram illustrating an active air skirt device according to an embodiment of the present invention.
Figure 2:
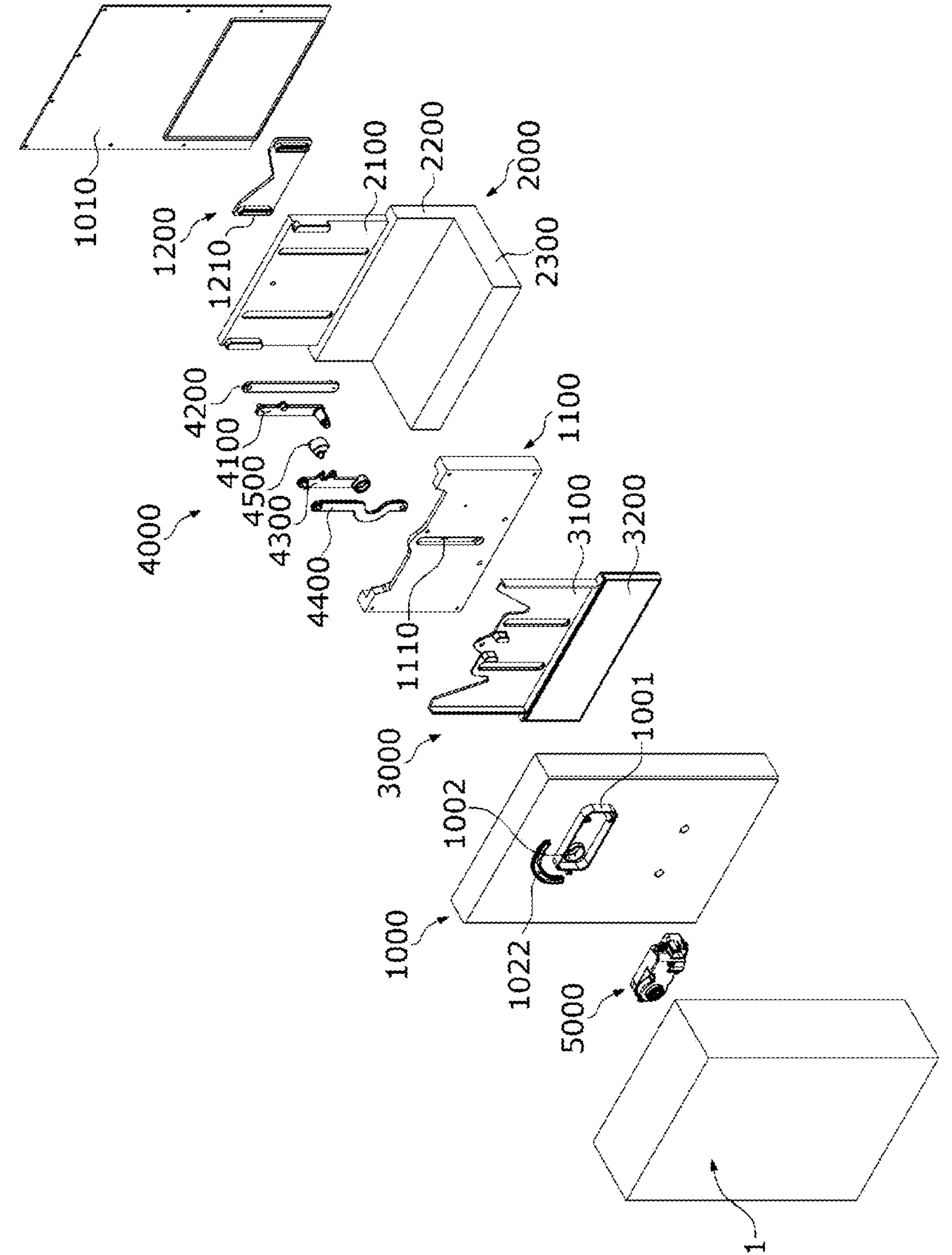
FIG. 2 is an exploded perspective view illustrating the configuration of an active air skirt device according to an embodiment of the present invention.
Figure 3:
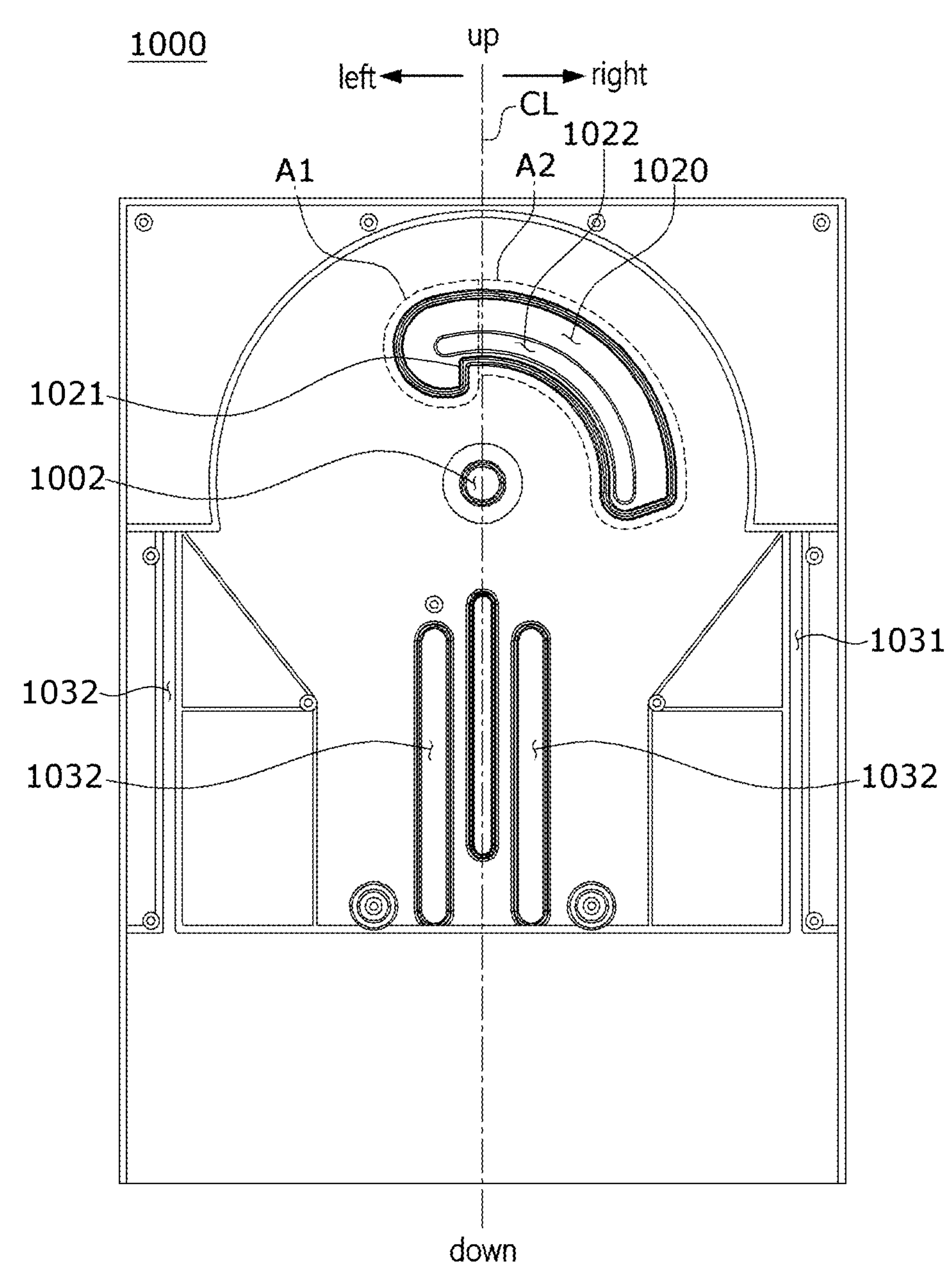
FIG. 3 is a diagram illustrating the housing in the active air skirt device.
Figure 4:
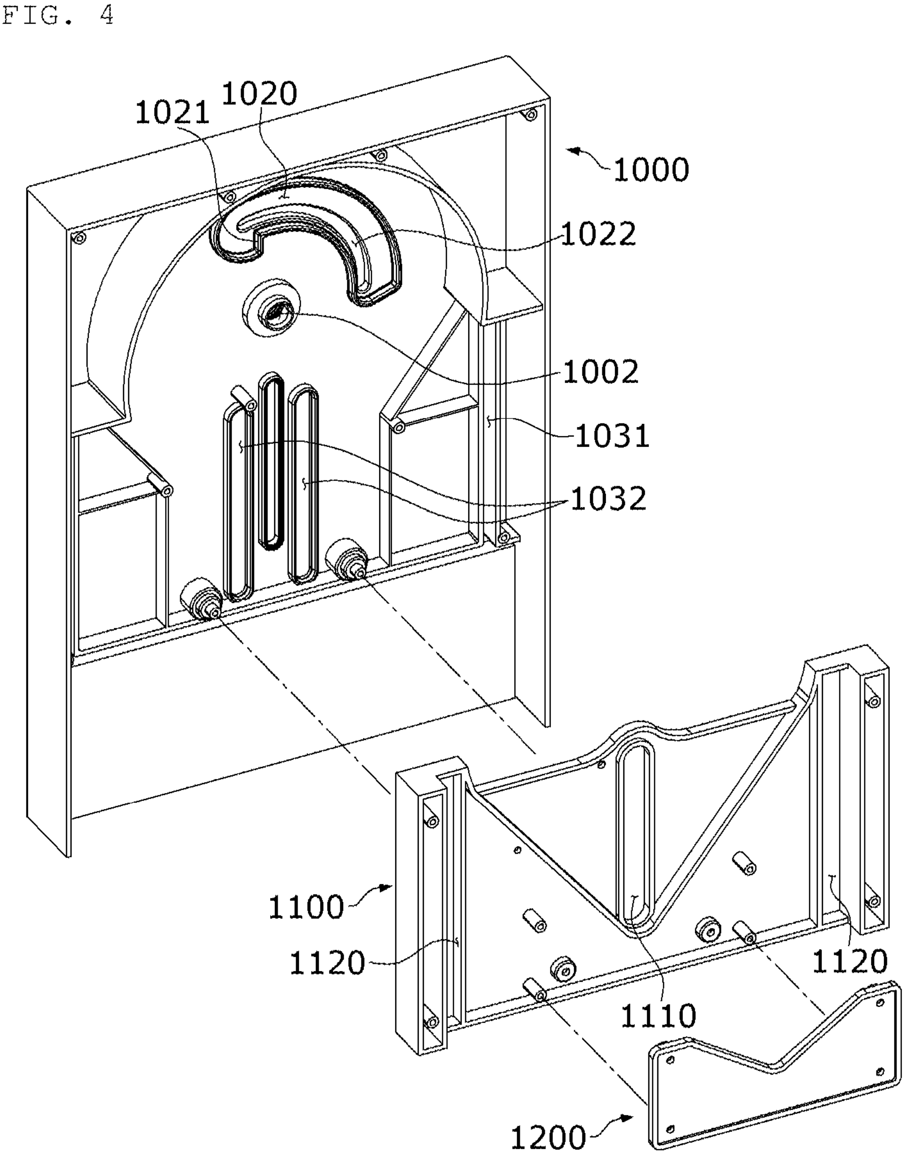
FIG. 4 is a diagram illustrating the lamp bracket attached to the housing and the skirt bracket attached to the lamp bracket.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments of the present invention will be described in detail with reference to the accompanying drawings, and components which are the same or correspond to each other will be denoted by the same or corresponding reference numerals in all drawings, and redundant descriptions will be omitted.

FIGS. 1 to 7 illustrate the active air skirt device and its components according to an embodiment of the present invention.

With reference to the drawings, the active air skirt device according to an embodiment of the present invention may include a housing 1000, a skirt 2000, a lamp unit 3000, and a drive link 4000.

The housing 1000 has an internal space and may be mounted with an actuator 5000 on one side. The housing 1000 may have a roughly rectangular box-shaped structure with open rear and bottom, and a back cover 1010 may be attached to the rear.

The skirt 2000, lamp unit 3000, and drive link 4000 may be installed inside the internal space. On the front outer side of the housing 1000, a structure 1001 for mounting the actuator 5000 may be provided. The back cover 1010 may cover and protect the skirt 2000, lamp unit 3000, and drive link 4000.

A cover 1 may be attached to one side of the housing 1000. The cover 1 may protect the actuator 5000 mounted on one side of the housing 1000 from external environments. The cover 1 may also be used as a bracket to attach the housing 1000 to the bumper cover (not shown) of a vehicle.

In an embodiment, the cover 1 may be a bumper cover of a vehicle. That is, the cover 1 may be a portion of the bumper cover of the vehicle, and the active air skirt device may be directly mounted on the bumper cover.

On the inner side of the housing 1000, a link guide groove 1020 for guiding the movement of the drive link 4000 may be formed.

The link guide groove 1020 may be provided in a circular arc shape centered around a hole 1002 formed for connection with the actuator 5000 in the upper area of the internal space. In an embodiment, the link guide groove 1020 may be formed in a roughly quarter-circle structure. The link guide groove 1020 includes a stop section A1, a moving section A2 extending with a narrower width than the stop section A1, and a holding step 1021 formed between the stop section A1 and the moving section A2. The stop section A1 may be positioned to the left of the vertical centerline CL dividing the housing 1000 while passing through the hole 1002.

The link guide groove 1020 may feature a guide hole 1022. The guide hole 1022 may have a slotted structure extending from the moving section A2 of the link guide groove 1020 to the stop section A1. The guide hole 1022 may accommodate the rotation axis 4510 of a guide pin 4500, as described later.

On the inner side of the housing 1000, a lamp guide groove 1030 for guiding the movement of the lamp unit 3000 may be formed. The lamp guide groove 1030 may include first lamp guide grooves 1031 and second lamp guide grooves 1032, provided in a linear shape extending vertically.

The first lamp guide grooves 1031 may be positioned at the edge of the lower area of the internal space, and the second lamp guide grooves 1032 may be placed between the first lamp guide grooves 1031.

On the inner side of the housing 1000, a lamp bracket 1100 for guiding the movement of the lamp unit 3000 may be attached. Additionally, on the opposite side of the lamp bracket 1100, opposite to the side facing the housing 1000, a skirt bracket 1200 for guiding the movement of the skirt 2000 may be attached.

The lamp bracket 1100 may have a lamp guide hole 1110 formed to guide the movement of the lamp unit 3000. The lamp guide hole 1110 may be provided in a straight linear shape extending vertically along the center of the lamp bracket 1100.

On the face where the skirt bracket 1200 is attached to the lamp bracket 1100, skirt guide grooves 1120 for guiding the movement of the skirt 2000 may be formed. The skirt guide grooves 1120 may be positioned at the left and right edges of the lamp bracket 1100, extending in a straight linear shape vertically.

The skirt bracket 1200 may be attached to the lower area of the lamp bracket 1100. In this configuration, the skirt bracket 1200 may have a structure partially recessed from top to bottom to avoid obscuring the lamp guide hole 1110 when attached to the lamp bracket 1100.

On the side where the skirt bracket 1200 faces the lamp bracket 1100, skirt guide protrusions 1210 may be provided.

The skirt 2000 is placed inside the internal space of the housing 1000 and may be installed to move vertically for reciprocating motion. In an embodiment, the skirt 2000 may be positioned between the lamp bracket 1100 and the skirt bracket 1200.

Figures 5A, 5B:
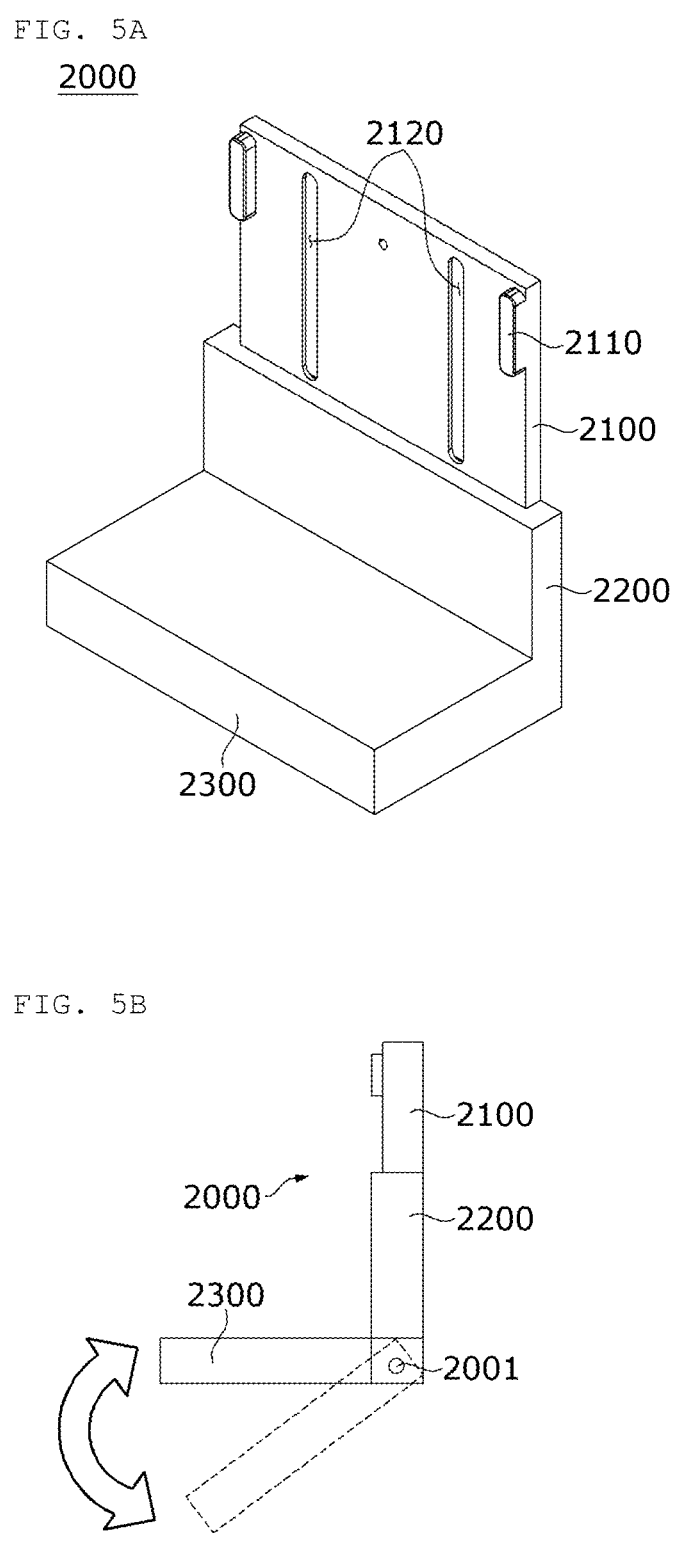

With reference to (a) of FIG. 5, the skirt 2000 may include a connecting portion 2100 that connects to the drive link 4000, a first body portion 2200 extending downward from the connecting portion 2100, and a second body portion 2300 that is bent at the bottom of the first body portion 2200 and extends towards the front of the housing 1000.

On the side where the connecting portion 2100 faces the lamp bracket 1100, skirt protrusions 2110 that connect to the skirt guide grooves 1120 may be provided. Additionally, the connecting portion 2100 may have skirt guide holes 2120 formed to guide the movement of the skirt 2000 and connect with the skirt guide protrusions 1210 of the skirt bracket 1200.

When the connecting portion 2100 moves downward to the lower part of the housing 1000, the first body portion 2200 and the second body portion 2300 may extend outward from the lower part of the housing 1000 towards the front of the housing 1000. Thus, the first body portion 2200 and the second body portion 2300 may deploy beneath the bumper cover, blocking the lower space of the bumper cover.

In an embodiment, the first body portion 2200 and the second body portion 2300 may be connected rotatably via a hinge axis 2001 to allow rotational movement. As shown in (b) of FIG. 5, the second body portion 2300 is provided in a structure hinged to the first body portion 2200, allowing to rotate downward from the first body portion 2200.

As a result, this configuration allows for more effective utilization of downforce and enhances aerodynamic performance by more effectively blocking airflow entering the underside of the vehicle during high-speed driving.

The lamp unit 3000 is positioned between the housing 1000 and the skirt 2000 inside the internal space, allowing for vertical reciprocating motion. In an embodiment, the lamp unit 3000 may be placed between the inner side of the housing 1000 and the lamp bracket 1100.

Figure 6:
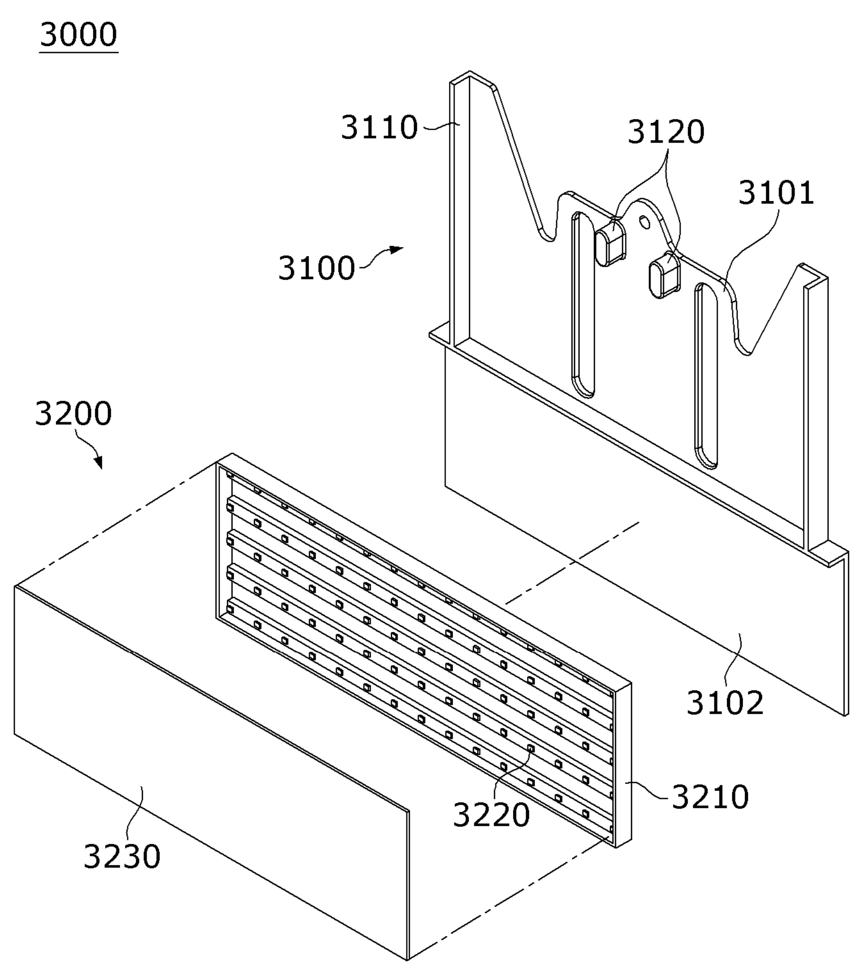
FIG. 6 is a diagram illustrating the lamp unit in the active air skirt device.

With reference to FIG. 6, the lamp unit 3000 may include a lamp frame 3100 connected to the drive link 4000 and a lamp module 3200 mounted on the lamp frame 3100.

The lamp frame 3100 is divided into an upper part 3101 and a lower part 3102, the upper part 3101 including first lamp protrusions 3110 connected to the first lamp guide grooves 1031 of the housing 1000 and second lamp protrusions 3120 connected to the second lamp guide grooves 1032. The first lamp protrusions 3110 may be positioned at the edges of the upper part 3101, and the second lamp protrusions 3120 may be positioned between the first lamp protrusions 3110.

The lamp module 3200 may be fixedly mounted on the lower part 3102 of the lamp frame 3100. The lamp module 3200 includes a substrate 3210 and a plurality of light sources 3220 mounted on the substrate 3210, and the plurality of light sources 3220 may be protected by a protective cover 3230. In an embodiment, the light sources 3220 includes a light emitting diode LED, and the protective cover 3230 may be configured to diffuse light.

When the lamp frame 3100 moves to the lower part of the housing 1000, the lamp module 3200 may be extended outward from the lower part of the housing 1000 to face the front of the housing 1000. In this case, the lamp module 3200 may be positioned above the second body part 2300 of the skirt 2000 and in front of the first body part 2200 of the skirt 2000. Accordingly, the lamp module 3200 may be deployed under the bumper cover to function as a fog lamp or daytime running lamp (DRL).

The drive link 4000 may transmit power from the actuator 5000 to the skirt 2000 and lamp unit 3000. The drive link 4000 may be configured to selectively move the skirt 2000 or both the skirt 2000 and lamp unit 3000 depending on the direction of rotation.

Figure 7:
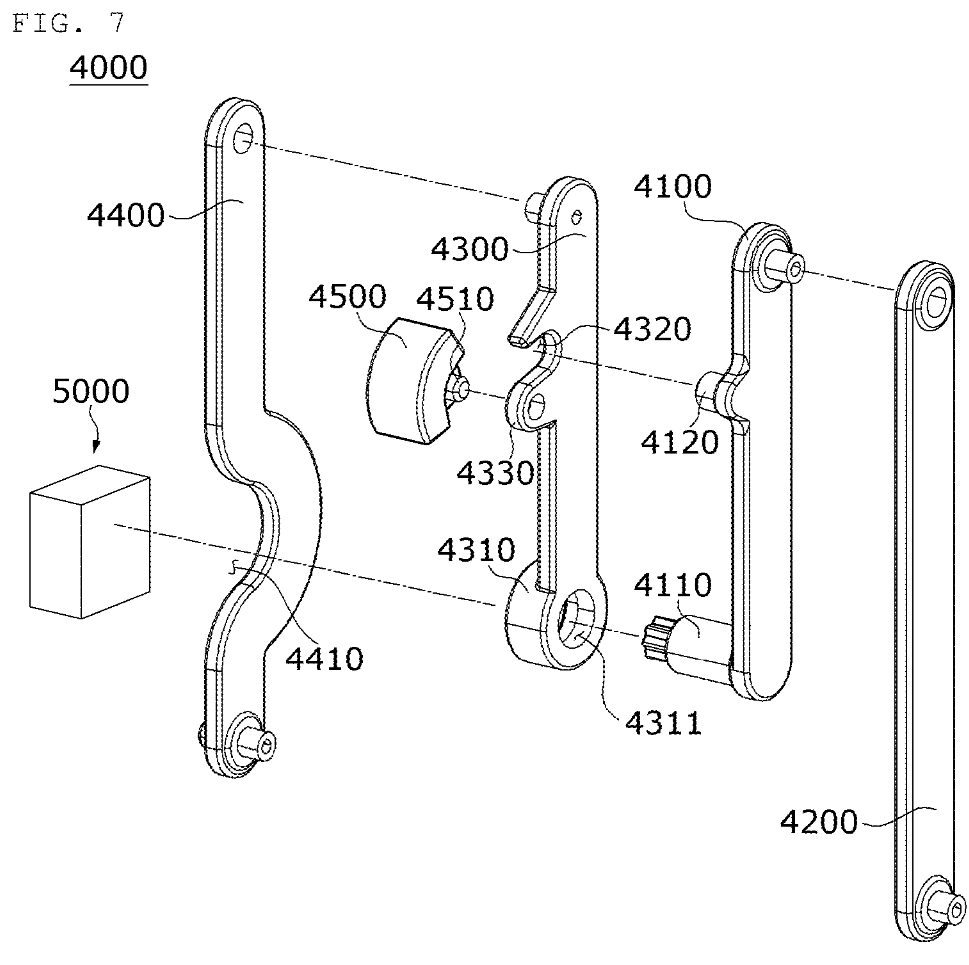
FIG. 7 is a diagram illustrating the drive link in the active air skirt device.

With reference to FIG. 7, the drive link 4000 may include a first skirt link 4100, a second skirt link 4200, a first lamp link 4300, and a second lamp link 4400. Based on the inner side of the housing 1000, the second lamp link 4400, the first lamp link 4300, the first skirt link 4100, and the second skirt link 4200 may be sequentially arranged.

The first skirt link 4100 may be equipped with a drive shaft 4110 at one end, which passes through a hole 1002 formed in the housing 1000 and connects to the actuator 5000. The second skirt link 4200 may be rotatably connected at one end to the other end of the first skirt link 4100, and at the other end, may be connected to the skirt 2000.

When the first skirt link 4100 connected to the actuator 5000 rotates, the second skirt link 4200 linked to the first skirt link 4100 may also rotate, thereby allowing the skirt 2000 to move vertically along the up and down direction.

The first lamp link 4300 may be equipped with a connecting shaft 4310 having a through hole 4311 through which the drive shaft 4110 of the first skirt link 4100 passes, and may be rotatably connected to the drive shaft 4110. The second lamp link 4400 may be rotatably connected at one end to the other end of the first lamp link 4300, and at the other end, may be connected to the lamp unit 3000.

The first lamp link 4300 may have an engagement slot 4320 open towards one direction relative to the vertical centerline CL dividing the housing 1000 and passing through the hole 1002. Additionally, the first skirt link 4100 may be provided with an engagement protrusion 4120 that engages with the engagement slot 4320. In this embodiment, the engagement slot 4320 is illustrated as open towards the left side of the housing 1000 relative to the vertical centerline CL, but this example is not limiting.

When the engagement protrusion 4120 of the first skirt link 4100 rotates in the opposite direction to the open direction of the engagement slot 4320, the first lamp link 4300 rotates in the same direction along with the first skirt link 4100. That is, when the first skirt link 4100 rotates in one direction, the engagement protrusion 4120 disengages from the engagement slot 4320, having no effect on the first lamp link 4300. However, when the first skirt link 4100 rotates in the opposite direction, the engagement protrusion 4120 engages with the engagement slot 4320, causing the first lamp link 4300 to rotate in the opposite direction. In an embodiment, one direction may correspond to the left direction relative to the vertical centerline CL, and the other direction may correspond to the right direction.

The first lamp link 4300 may be equipped with a guide pin 4500 that is rotatably connected. In detail, the guide pin 4500 may be rotatably connected to a protrusion portion 4330 on the first lamp link 4300, protruding in one direction to implement the engagement slot 4320. That is, the guide pin 4500 may be positioned at a location beneath the connection groove 4320, facing in one direction.

The guide pin 4500 may be configured to move along the link guide groove 1020 formed on the inner side of the housing 1000, thereby restricting the movement path and range of the first lamp link 4300. The guide pin 4500 may be provided in a plate structure roughly resembling a quarter-circle, equipped with a rotational axis 4510 extending to both the upper and lower surfaces.

The guide pin 4500 is positioned within the link guide groove 1020 such that the rotating shaft 4510, extending to the lower surface, is inserted into the guide hole 1022 and, extending to the upper surface, connects to the first lamp link 4300.

The first skirt link 4100 and the second skirt link 4200, along with the first lamp link 4300 and the second lamp link 4400, may have a linear extended structure. Additionally, the second lamp link 4400 may be formed with a curved structure, equipped with a receiving recess 4410 open in one direction.

The second lamp link 4400 may be configured to accommodate the connecting shaft 4310 of the first lamp link 4300 and the drive shaft 4110 of the first skirt link 4100 within the receiving recess 4410, when positioned towards the upper part of the housing 1000 along with the first lamp link 4300 (normal mode). That is, the receiving recess 4410 serves to bypass the connecting shaft 4310 of the first lamp link 4300 and the drive shaft 4110 of the first skirt link 4100 when the second lamp link 4400 is positioned in an upward extension structure along with the first lamp link 4300 towards the upper part of the housing 1000, between the inner side of the housing 1000 and the first lamp link 4300.

Hereinafter, a description is made of the mechanism for moving the skirt 2000 and the lamp unit 3000 via the drive link 4000.

Figure 8:
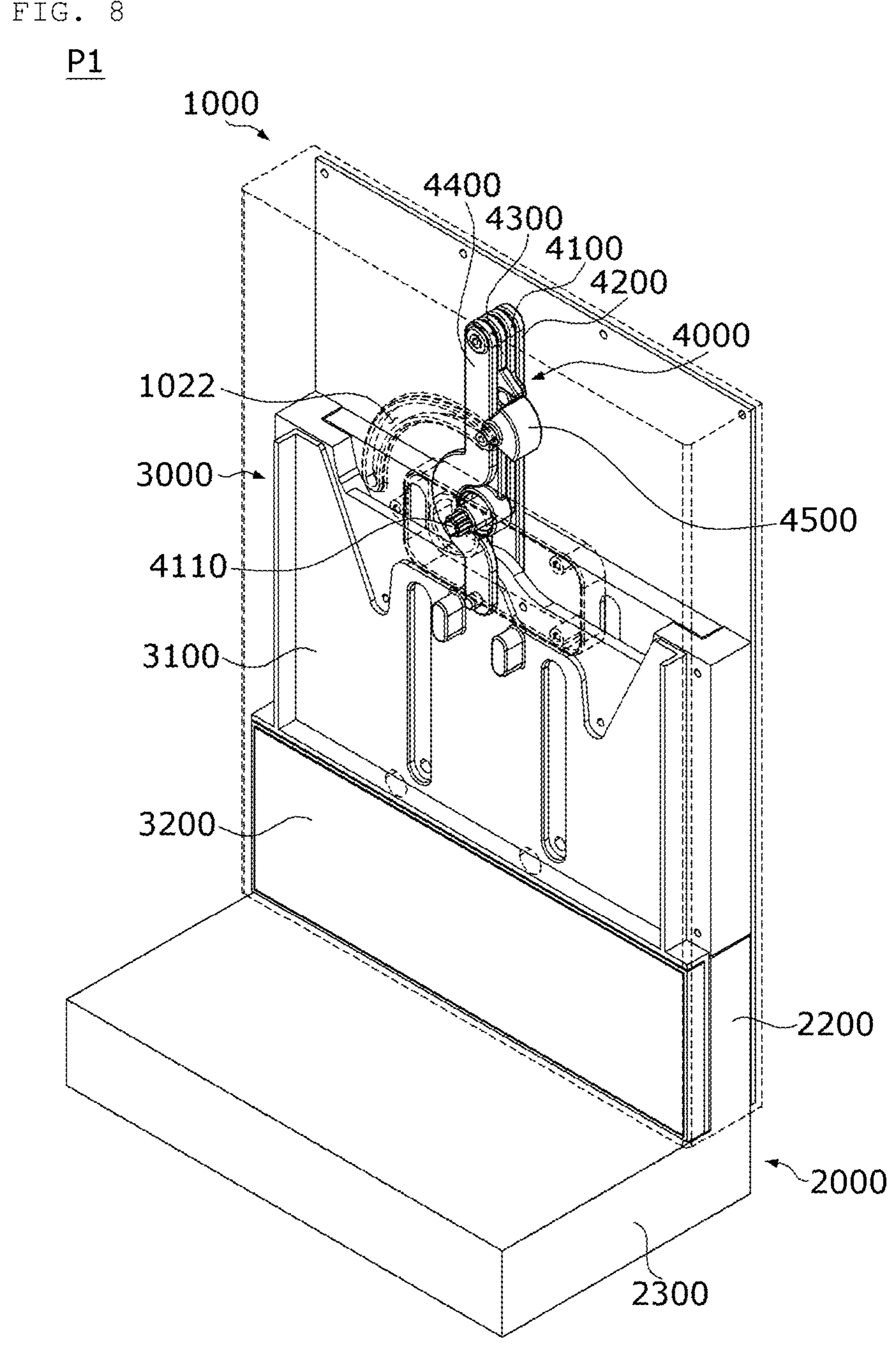
FIGS. 8 and 9 are diagrams illustrating the drive link, skirt, and lamp unit in normal mode.
Figure 9:
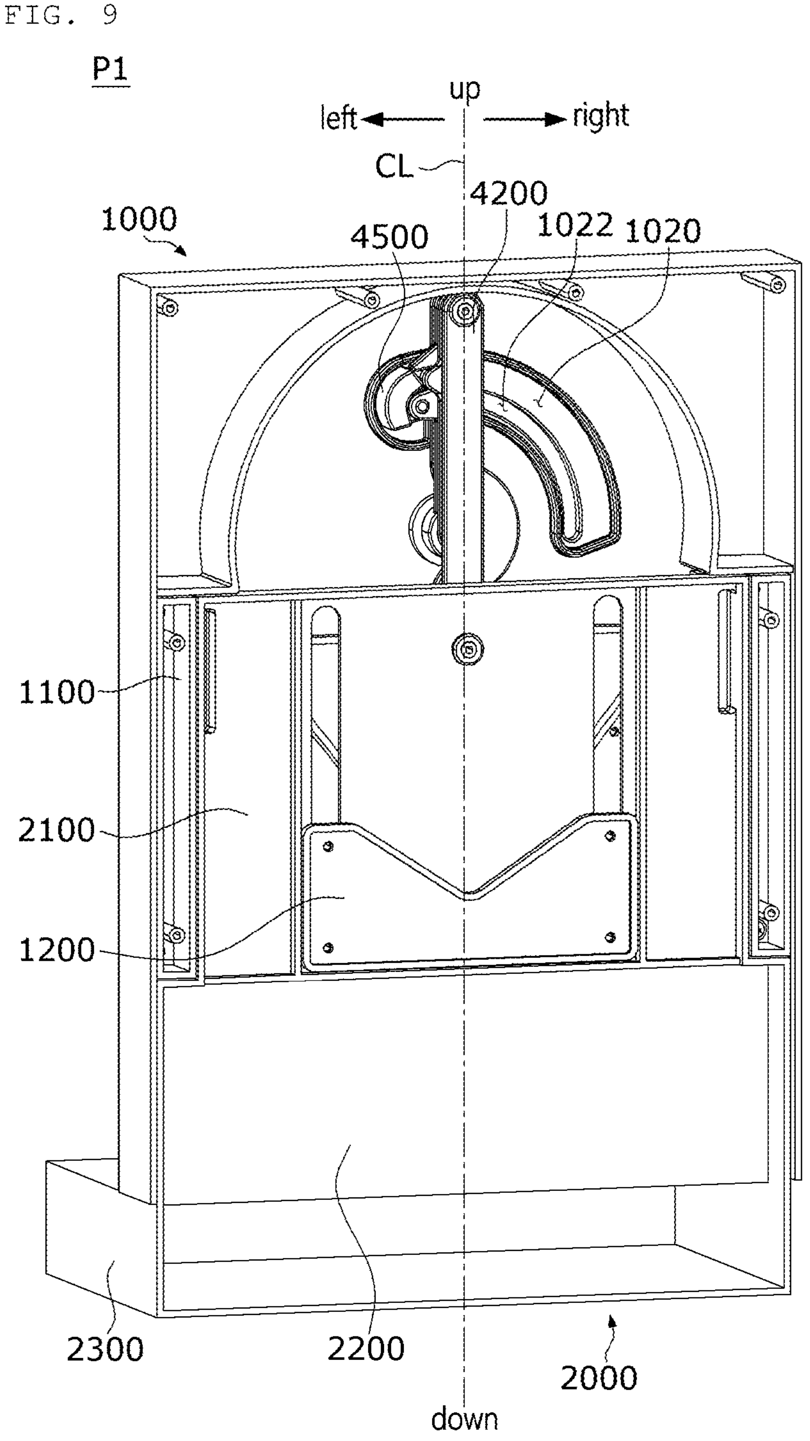

As shown in FIGS. 8 and 9, in the normal mode P1, the actuator 5000 does not operate, and the drive link 4000 may be arranged in a structure that extends vertically along the central line CL. In the normal mode P1, the skirt 2000 and the lamp unit 3000 may be arranged in a stowed state within the housing 1000.

Figure 10:
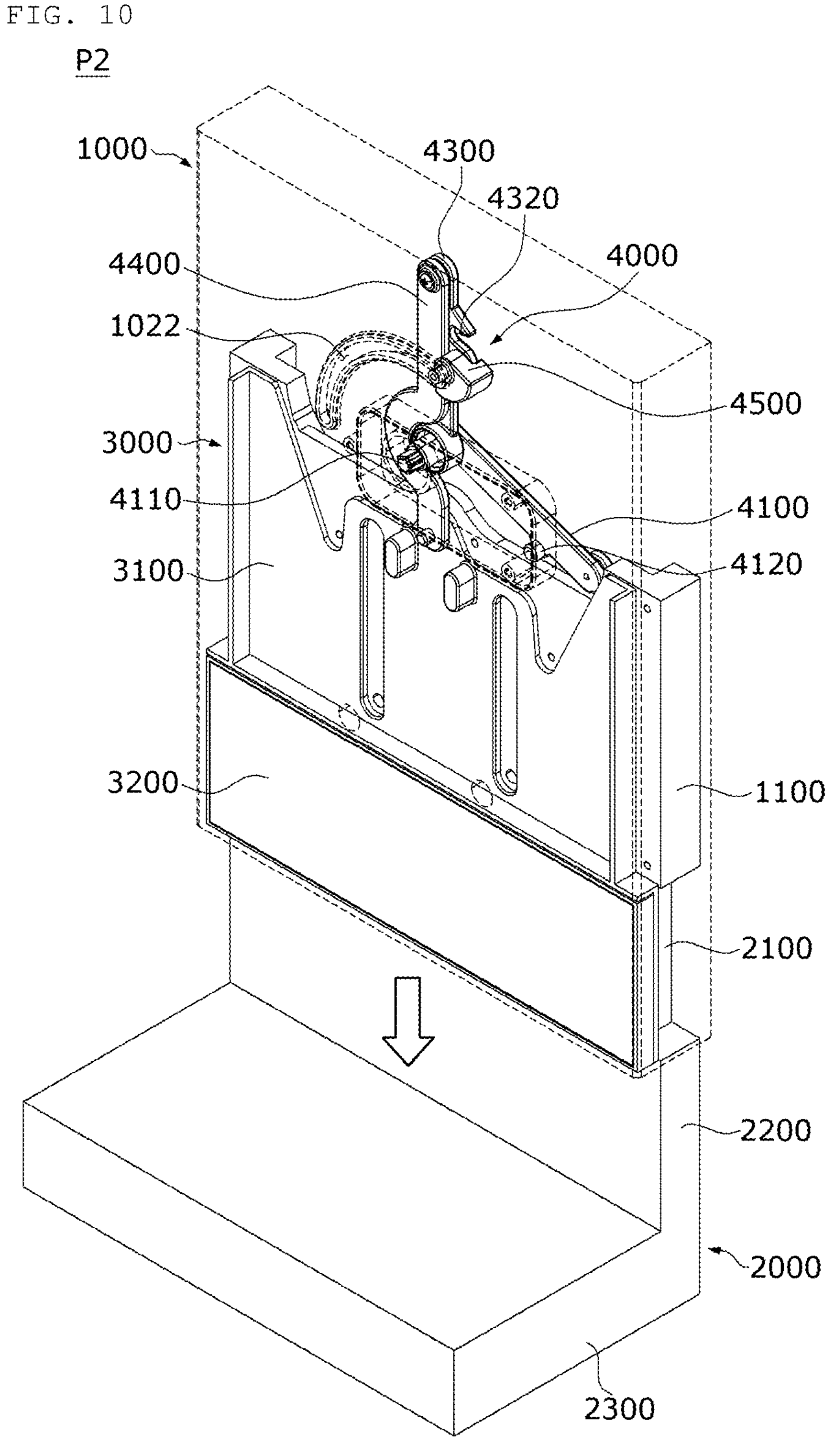
FIGS. 10 and 11 are diagrams illustrating the drive link, skirt, and lamp unit in the first operation mode.
Figure 11:
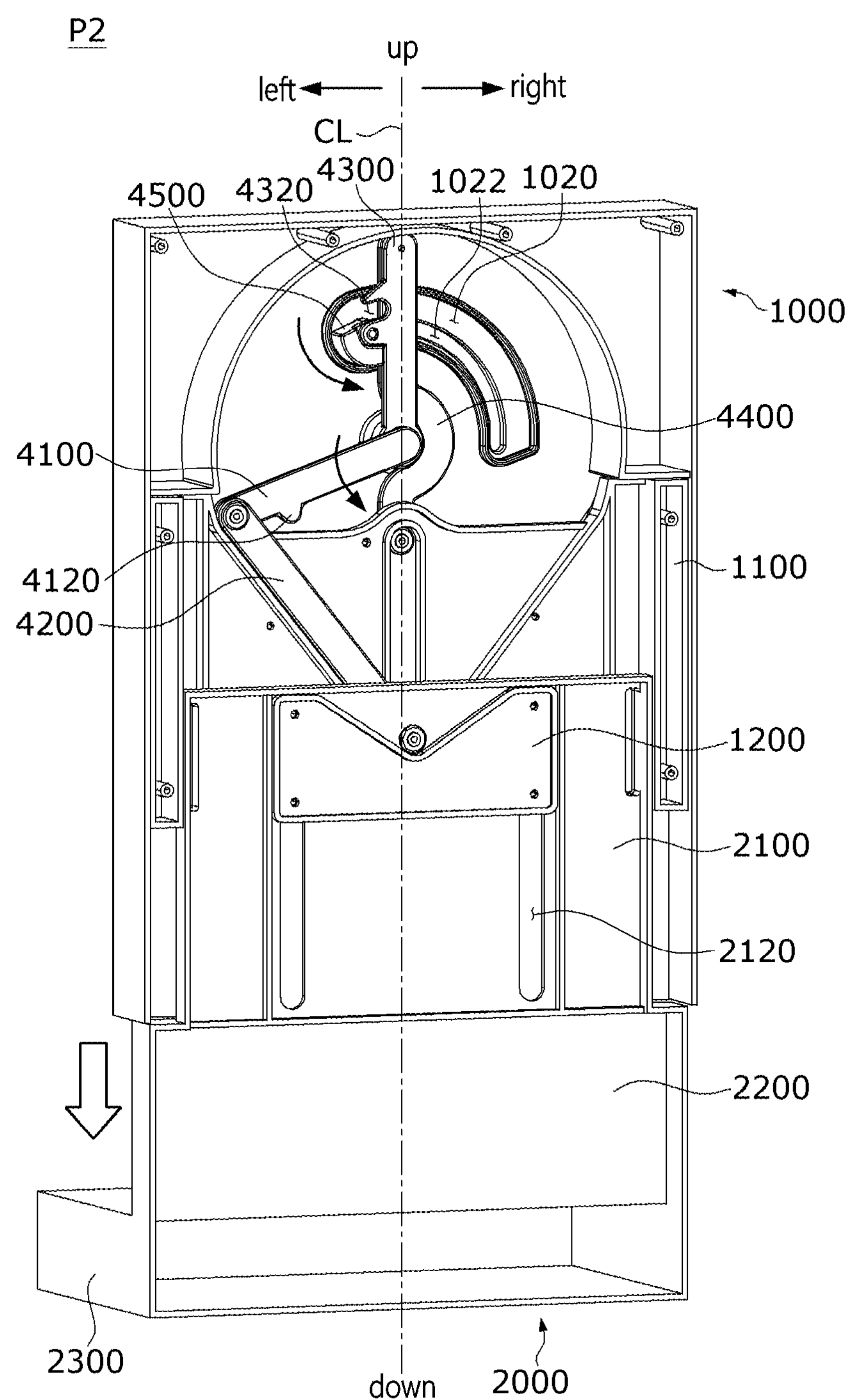
Figure 12:
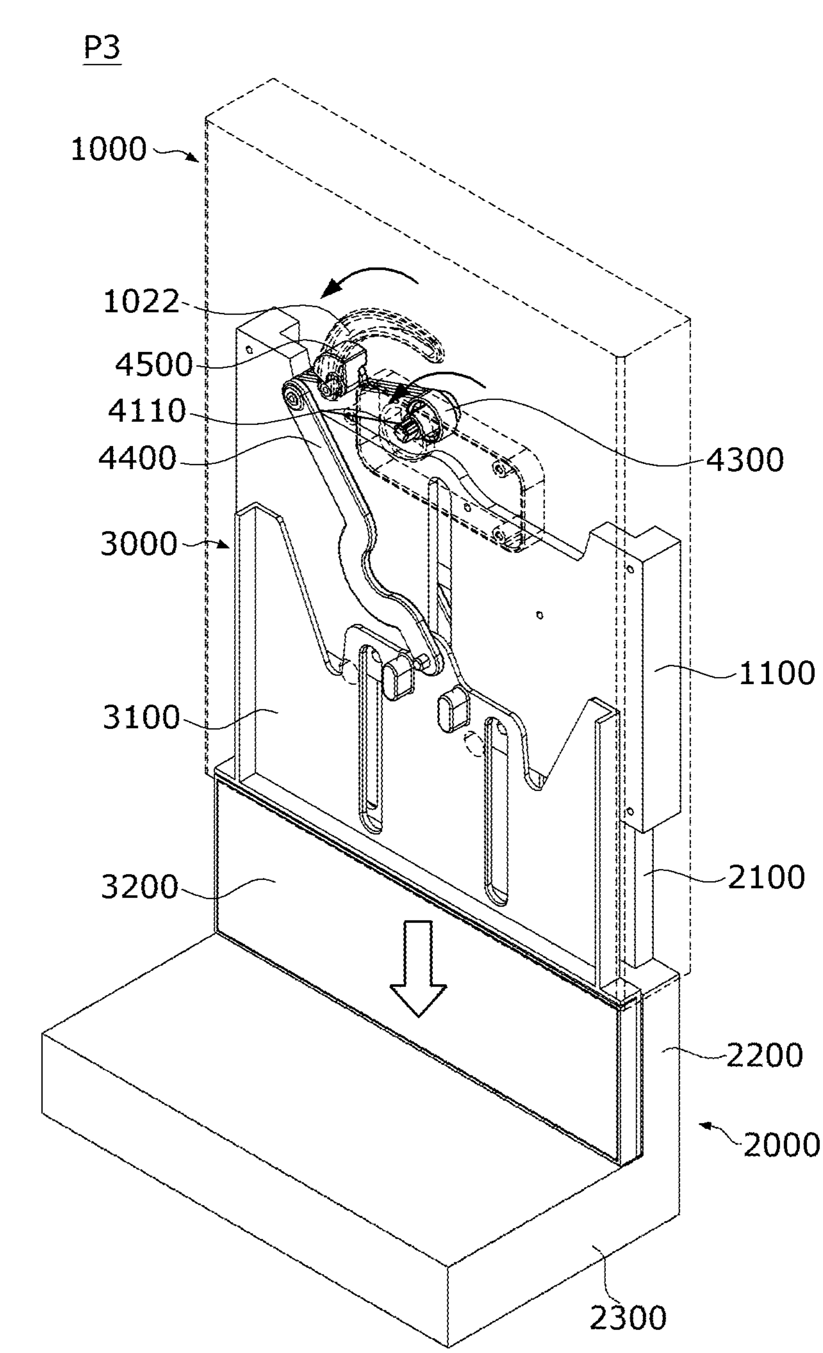
FIGS. 12 and 13 are diagrams illustrating the drive link, skirt, and lamp unit in the second operation mode.
Figure 13:
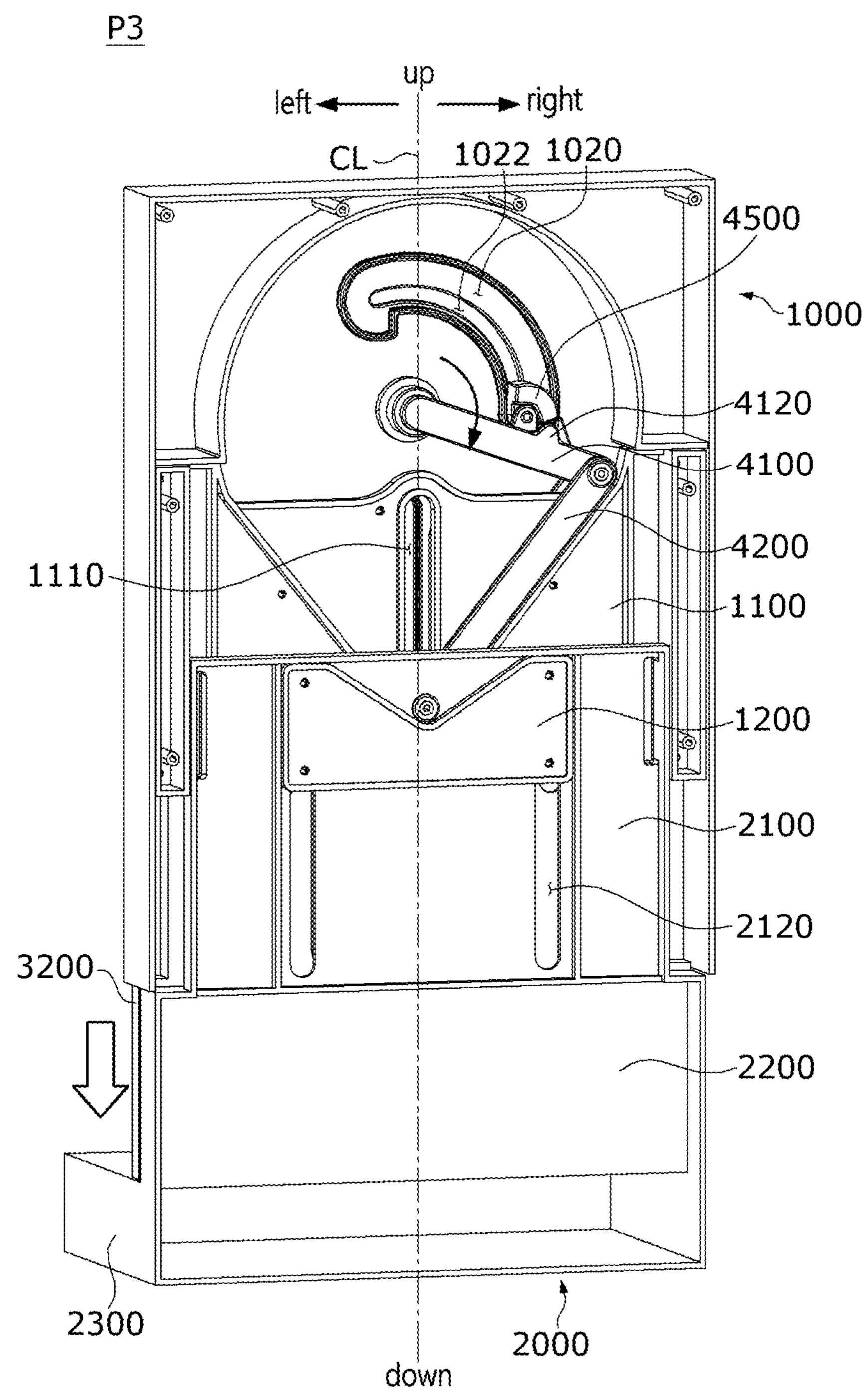

As shown in FIGS. 10 and 11, in the first operating mode P2, the drive link 4000 may rotate in one direction (left direction) to move the skirt 2000.

In detail, by the operation of the actuator 5000, the first skirt link 4100 rotates in one direction, and the second skirt link 4200 connected to the first skirt link 4100 also rotates, causing the skirt 2000 to move downward below the housing 1000. As a result, the first body portion 2200 and the second body portion 2300 of the skirt 2000 may be deployed into the lower space of the bumper cover.

Meanwhile, as the first skirt link 4100 rotates in one direction, the guide pin 4500 may rotate in on direction to be fixedly hooked by the holding step 1021 at the step section A1 of the link guide groove 1020 due to the engagement protrusion 4120 exiting the engagement slot 4320 of the first lamp link 4300. As a result, the movement of the first lamp link 4300 is restricted in one direction and opposite direction (right direction), and the lamp unit 3000 may be positioned in a stowed state within the housing 1000.

As shown in 12 and 13, in the second operating mode P3, the drive link 4000 may rotate in the opposite direction to move the skirt 2000 and the lamp unit 3000 together.

In detail, by the operation of the actuator 5000, the first skirt link 4100 rotates in the opposite direction, and the second skirt link 4200, connected to the first skirt link 4100, also rotates, causing the skirt 2000 to move downward below the housing 1000. As a result, the first body portion 2200 and the second body portion 2300 of the skirt 2000 may be deployed into the lower space of the bumper cover.

Meanwhile, as the first skirt link 4100 rotates in the opposite direction, the first lamp link 4300 also rotates in the opposite direction along with the first skirt link 4100 via the engagement protrusion 4120 engaged with the engagement slot 4320 of the first lamp link 4300, and the second lamp link 4400 connected to the first lamp link 4300 also rotates, moving the lamp unit 3000 downwards into the lower part of the housing 1000. In this process, the guide pin 4500 rotates in the opposite direction, releasing from the holding step 1021 and guiding the movement of the first lamp link 4300 along the moving section A2 from the stop section A1.

As the lamp unit 3000 moves downward into the lower part of the housing 1000, the lamp module 3200 may deploy into the lower space of the bumper cover. In this case, the lamp module 3200 may be positioned on the front of the first body portion 2200 and on the top of the second body portion 2300.

As described above, according to an embodiment of the present invention, the skirt 2000 is deployed to the lower part of the bumper cover, blocking the airflow entering the lower space of the bumper cover, thereby more effectively improving aerodynamic performance.

Additionally, the lamp unit 3000 is configured to be selectively deployed to the lower part of the bumper cover together with the skirt 2000, thereby enabling it to perform the function of fog lamps or daytime running lamps. Therefore, this makes it possible to resolve the problem of increased investment and design costs caused by the design bifurcation due to the application and non-application of fog lamps in existing vehicles of the same model. That is, it is possible to achieve design unification regardless of whether fog lamps are installed on the same vehicle model.

Moreover, the deployment of the skirt 2000 alone or both the skirt 2000 and the lamp unit 3000 can be selectively controlled by rotating the drive link 4000 in one direction or the opposite direction.

The active air skirt device for a vehicle, according to an embodiment of the present invention, is advantageous for improving aerodynamic performance and, consequently, enhancing fuel efficiency and driving stability, while also selectively implementing lamp functions.

The effects of the present invention are not limited to the aforesaid, and other effects not described herein with will be clearly understood by those skilled in the art from the claims.

While the foregoing description has focused on specific embodiments of the present invention, it should be understood that various modifications and changes can be made by those skilled in the art without departing from the spirit and scope of the invention as defined in the appended claims. Furthermore, any distinctions arising from such modifications and changes should be understood to fall within the scope of the present invention as delineated in the appended claims.

What is claimed is:

1. An active air skirt device comprising:

a housing;

an actuator installed in the housing;

a skirt installed in an internal space of the housing and configured to reciprocate vertically;

a lamp arranged between the housing and the skirt in the internal space to reciprocate vertically; and a drive link connected to the skirt and the lamp, wherein the drive link is configured to:

transmit power from the actuator; and selectively move the skirt or both the skirt and the lamp depending on the rotation direction of the drive link.

2. The active air skirt of claim 1, wherein the drive link comprises:

a first skirt link comprising, at a first end, a drive shaft connected to the actuator, the drive shaft extendible through a hole formed on the housing;

a second skirt link connected at a first end to a second end of the first link and, and at a second end, to the skirt;

a first lamp link comprising a connecting shaft having a through hole at a first end through which the drive shaft passes; and a second lamp link connected at a first end to a second end of the first lamp link and, at a second end, to the lamp.

3. The active air skirt device of claim 2, wherein the first lamp link comprises an engagement slot that is open towards one direction relative to a vertical centerline dividing the housing and passing through the hole, wherein the first skirt link comprises an engagement protrusion engaging with the engagement slot, and wherein the first lamp link, based on the first skirt link rotating to the other direction opposite to the direction to which the engagement slot is open, is configured to rotate in the other direction together with the first skirt link.

4. The active air skirt device of claim 2, wherein the first lamp link comprises a rotatably connected guide pin, which moves along a link guide groove formed on an inner surface of the housing, limiting a movement path and a range of the first lamp link.

5. The active air skirt device of claim 4, wherein the link guide groove comprises:

a circular arc shape centered around the hole; and a guide hole through which a rotation axis of the guide pin extends therethrough.

6. The active air skirt device of claim 2, wherein the second lamp link comprises a structure including a curved portion forming a receiving recess open in one direction, and wherein the receiving recess accommodates the connecting shaft of the first lamp link and the drive shaft of the first skirt link, in response to the second lamp link being arranged towards the upper part of the housing along with the first lamp link.

7. The active air skirt device of claim 1, wherein the skirt comprises:

a connecting portion connected to the drive link;

a first body portion extending downward from the connecting portion; and a second body portion bent at the bottom of the first body portion and extending towards the front of the housing, wherein the first body portion and the second body portion are extended outward from the bottom of the housing to face forward in front of the housing, in response to the connecting portion moving to the lower part of the housing.

8. The active air skirt device of claim 1, wherein the lamp comprises:

a lamp frame connected to the drive link; and a lamp module mounted on the lamp frame, the lamp module extending outward from the bottom of the housing and positioned to face forward in front of the housing in response to the lamp frame moving to the lower part of the housing.

9. The active air skirt device of claim 1, further comprising:

a lamp bracket attached on the inner side of the housing to guide the movement of the lamp; and a skirt bracket attached to the side of the lamp bracket, opposite to the side facing the housing, to guide the movement of the skirt.

10. The active air skirt device of claim 9, wherein the lamp is arranged between the inner side of the housing and the lamp bracket, and wherein the skirt is arranged between the lamp bracket and the skirt bracket.

11. An active air skirt device for a vehicle, the active air skirt device comprising:

a housing;

an actuator installed in the housing;

a skirt installed in an internal space of the housing and configured to reciprocate vertically;

a lamp arranged between the housing and the skirt in the internal space to reciprocate vertically;

a drive link connected to the actuator, the skirt and the lamp; and a controller configured to actuate the actuator such that power from the actuator is transmitted to the drive link to selectively move, based on a rotation direction of the drive link, at least one of the skirt, the lamp, or a combination thereof.

12. The active air skirt of claim 11, wherein the drive link comprises:

a first skirt link comprising, at a first end, a drive shaft connected to the actuator, the drive shaft extendible through a hole formed on the housing;

a second skirt link connected at a first end to a second end of the first link and, and at a second end, to the skirt;

a first lamp link comprising a connecting shaft having a through hole at a first end through which the drive shaft passes; and a second lamp link connected at a first end to a second end of the first lamp link and, at a second end, to the lamp.

13. The active air skirt device of claim 12, wherein the first lamp link comprises an engagement slot that is open towards one direction relative to a vertical centerline dividing the housing and passing through the hole, wherein the first skirt link comprises an engagement protrusion engaging with the engagement slot, and wherein the first lamp link, based on the first skirt link rotating to the other direction opposite to the direction to which the engagement slot is open, is configured to rotate in the other direction together with the first skirt link.

14. The active air skirt device of claim 12, wherein the first lamp link comprises a rotatably connected guide pin, which moves along a link guide groove formed on an inner surface of the housing, limiting a movement path and a range of the first lamp link.

15. The active air skirt device of claim 14, wherein the link guide groove comprises:

a circular arc shape centered around the hole; and a guide hole through which a rotation axis of the guide pin extends therethrough.

16. The active air skirt device of claim 12, wherein the second lamp link comprises a structure including a curved portion forming a receiving recess open in one direction, and wherein the receiving recess accommodates the connecting shaft of the first lamp link and the drive shaft of the first skirt link, in response to the second lamp link being arranged towards the upper part of the housing along with the first lamp link.

17. The active air skirt device of claim 11, wherein the skirt comprises:

a connecting portion connected to the drive link;

a first body portion extending downward from the connecting portion; and a second body portion bent at the bottom of the first body portion and extending towards the front of the housing, wherein the first body portion and the second body portion are extended outward from the bottom of the housing to face forward in front of the housing, in response to the connecting portion moving to the lower part of the housing.

18. The active air skirt device of claim 11, wherein the lamp comprises:

a lamp frame connected to the drive link; and a lamp module mounted on the lamp frame, the lamp module extending outward from the bottom of the housing and positioned to face forward in front of the housing in response to the lamp frame moving to the lower part of the housing.

19. The active air skirt device of claim 11, further comprising:

a lamp bracket attached on the inner side of the housing to guide the movement of the lamp; and a skirt bracket attached to the side of the lamp bracket, opposite to the side facing the housing, to guide the movement of the skirt.

20. The active air skirt device of claim 19, wherein the lamp is arranged between the inner side of the housing and the lamp bracket, and wherein the skirt is arranged between the lamp bracket and the skirt bracket.

* * * * *